(12) United States Patent
Kong et al.

(10) Patent No.: US 6,590,046 B2
(45) Date of Patent: Jul. 8, 2003

(54) CATALYST FOR POLYMERIZATION OF OLEFIN AND THE METHOD OF POLYMERIZATION OF OLEFIN USING THE SAME

(75) Inventors: Gap-Goung Kong, Yuseong-ku (KR); Seung-Hwan Jung, Changan-ku (KR); Won Lee, Yuseong-ku (KR); Yong-Hwan Kim, Yuseong-ku (KR)

(73) Assignee: Samsung General Chemicals Co., Ltd. (KR)

( * ) Notice: Subject to any disclaimer, the term of this patent is extended or adjusted under 35 U.S.C. 154(b) by 0 days.

(21) Appl. No.: 09/864,805

(22) Filed: May 24, 2001

(65) Prior Publication Data

US 2002/0115800 A1 Aug. 22, 2002

(30) Foreign Application Priority Data

Dec. 18, 2000 (KR) ......................................... 2000-77602

(51) Int. Cl.[7] .................................................. C08F 4/44
(52) U.S. Cl. .................... 526/151; 526/124.2; 526/148; 526/135; 502/123; 502/167
(58) Field of Search ................................ 502/123, 167; 526/148, 151, 135

(56) References Cited

U.S. PATENT DOCUMENTS

| | | | |
|---|---|---|---|
| 5,134,104 A | 7/1992 | Sasaki et al. | 502/103 |
| 5,439,995 A | 8/1995 | Bailly et al. | 526/125 |
| 5,455,316 A | 10/1995 | Tsutsui et al. | 526/114 |
| 5,502,128 A | 3/1996 | Flores et al. | 526/160 |
| 6,114,276 A | * 9/2000 | Kong et al. | 502/226 |
| 6,500,906 B1 | * 12/2002 | Kong et al. | 526/124.2 |

FOREIGN PATENT DOCUMENTS

| | | |
|---|---|---|
| EP | 0 606 125 A2 | 7/1994 |
| JP | 6-340711 | 12/1988 |
| JP | 63-191811 | 8/1994 |

OTHER PUBLICATIONS

Article entitled "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Phenoxide Titanium and Zirconium Species," by Arjan van der Linden et al., pp. 3008–3021, Journal of American Chemical Society, 1995, vol. 117.

Article entitled "Cationic Alkylzirconium complexes Based on a Tridentate Diamide Ligand: New Alkene Polymerization Catalysts," by Andrew D. Horton, et al, pp 2672–2674, Organometallics, 1996, vol. 15.

Article entitled Polymerization of Ethene by the Novel Titanium Complex [Ti(Me$_3$SiNCH$_2$CH$_2$NsiMe$_3$)Cl$_2$]; a Metallocene Analogue, by Suzanne Tinkler, et al., pp. 2623–2624, Chem. Commun., 1996.

Article entitled "Stereoregular Polymerization of α–Olefins Catalyzed by Chiral Group 4 Benzamidinate complexes of $C_1$ and $C_3$ Symmetry," by Claudia Averbuj et al., pp. 8640–8646,. Journal of Am. Chem. Soc., vol. 120, No. 34, 1998.

Article entitled "Synthesis of Group 4 Complexes That Contain the Tridentate Diamido/Donor Ligands [ArylINCH$_2$CH$_2$)$_2$)]$^{2-}$ and Zirconium Complexes That Contain [ArylINCH$_2$CH$_2$)$_2$S]$^{2-}$ and an Evaluation of Their Activity for the Polymerization of 1–Hexene," by Michael Aizenberg et al., pp. 4795–4812, Organometallics, vol. 17, No. 22, 1998.

Article entitled "[Ph)$_2$nacnac]MCl$_2$(THF)$_2$ (M—Ti, V, Cr): A New Class of Homogeneous Olefin Polymerization Catalysts Featuring β–Diiminate Ligands," by Woo–Kyu Kim et al., pp. 4541–4543, Organometallics, vol. 17, No. 21, 1998.

Article entitled Living Polymerization of α–Olefins by Chelating Diamide Complexes of Titanium, by John D. Scollard et al., pp. 10008–10009, J. Am. Chem. Soc., vol. 118, No. 41, 1996.

* cited by examiner

Primary Examiner—David W. Wu
Assistant Examiner—Rip A Lee
(74) Attorney, Agent, or Firm—Howrey Simon Arnold & White; Carter J. White

(57) ABSTRACT

The present invention relates to a catalyst for polymerization of olefin and the method of polymerization using the same, or more particularly, to a new catalyst for polymerization of olefin of a hybrid concept and the method of polymerization using the same, which comprises synthesizing a titanium compound chelated by means of amide and cyclopentadiene-based ligands, and activating the same by means of conventional MgCl$_2$, etc., instead of using expensive methylaluminoxane. Moreover, the present invention can produce polymers of narrow distribution of molecular weights and even distribution of composition of co-polymers.

21 Claims, 2 Drawing Sheets

Results of TREF

Results of TREF

CATALYST FOR POLYMERIZATION OF OLEFIN AND THE METHOD OF POLYMERIZATION OF OLEFIN USING THE SAME

This application claim priority under 35 USC §119 of application number 77602/2000, filed Dec. 18, 2000 in the Republic of Korea.

FIELD OF INVENTION

The present invention relates to a catalyst for polymerization of olefin and a method of polymerization using the same. More particularly the present invention relates to a new catalyst for polymerization of olefin of a hybrid concept and the method of polymerization using the same, which includes synthesizing a titanium compound chelated by means of amide and cyclopentadiene-based ligands, and then activating the same by means of conventional $MgCl_2$, etc., instead of using expensive methylaluminoxane.

BACKGROUND OF INVENTION

The polymerization reaction of olefin, in which a transition metal compound reacts with olefin, there have been continuous efforts to enhance the characteristics of polymers produced therein by changing the reaction environments of the transition metal compounds. In particular, there have been significant advances in the efforts to control the reaction environments where a transition metal compound reacts with olefin, by using a metallocene compound in which the ligand of a transition metal has been changed into a cyclopentadiene ligand. Into the 1980's, the homogeneous catalyst system using a metallocene compound started to receive spotlight on account of its (co)polymerization of α-olefin resulting in superior characteristics in terms of impact strength, transparency, etc. In particular, by synthesizing a metallocene compound having particular substituents, such as an indenyl, cycloheptadiene, or fluorenyl group, which control the electrical or stereo-spatial environment of the catalytic metal, a metallocene catalyst was developed to control the stereoregularity and molecular weights of polymers. The application of such catalyst systems has been expanding in the recent years. Moreover, by creating a heterogenious catalyst system by supporting a metallocene compound on an inorganic carrier, there have been advances into the development of a catalyst. For example it is reported that such catalysts can control the particle morphology of polymers while producing a superior set of co-polymers. For example, U.S. Pat. Nos. 5,439,995, 5,455,316, etc. report the production of a non-homogeneous catalyst system, having superior particle morphology and co-polymerization characteristics. This result is reportedly achieved by supporting zirconocene and titanocene compounds onto a magnesium or silica support. The use of a supported metallocene catalyst is disadvantageous in that it requires a complicated organometal-chemical synthesis to generate the catalyst and uses expensive methylaluminoxane (hereinafter MAO) or a boron compound as a co-catalyst during the polymerization of olefin. As such, there remains a continuous demand for a compounds, which are easier to synthesize. Moreover, the polymers produced by a metallocene catalyst have narrow distribution of molecular weights (Mw/Mn=2~3) and thus exhibit unfavorable attributes in terms of polymer processing.

In recent years, chelated compounds, either bidentate or tridentate, have been used as catalyst components, i.e., transition metals such as non-metallocene catalysts, beyond-metallocene catalysts, or organometallic catalysts. In using such chelated compounds, there has been much effort to develop a catalyst producing narrow distribution of molecular weights, but which is not as difficult to synthesize as the above noted metallocene compounds. Japanese Laid-Open Patent Sho 63-191811 presents results of polymerization of ethylene and propylene, carried out by means of a substituted compound as a catalyst component. As disclosed therein, a halide ligand of a titanium halide compound was substituted with a TBP (6-tert-butyl-4-methylphenoxy) ligand. As a result of polymerization of ethylene and propylene by using methylaluminoxane (MAO) as a co-catalyst, it is reported that the formation of polymers of high activities and molecular weights (average molecular weight=3,600,000 or more). U.S. Pat. No. 5,134,104 describes a catalyst for polymerization of olefin, having a dioctylamine titanium halide compound $((C_8H_{17})_2NTiCl_3)$ as a catalyst component, in which the halide ligand of $TiCl_4$ is changed into an amine ligand having a large steric volume. J. Am. Chem. Soc. (117, p. 3008) discloses a catalyst for polymerization of olefin using a compound in which a 1,1'-bi-2,2'-naphthol ligand is chelated to a titanium or zirconium transition metal, or the derivatives thereof, wherein said chelated compound can limit the steric space of the transition metal. Moreover, Japanese Laid-Open Patent Pyung 6-340711 and EP 0606125A2 disclose chelated catalysts for polymerization of olefin of narrow distribution of molecular weights while producing polymers of high molecular weights. The reported results are achieved by means of substituting halide ligand of titanium and zirconium transition metal compounds with a phenoxy group.

In the recent years, much attention has been paid to a non-metallocene catalysts for polymerization of olefin, which use an amine-based chelated transition metal compound. For example see *Organometallics*, 15, p.2672 (1996), and *Chem. Commun.*, p.2623 (1996). Such literature papers include examples of utilizing catalysts for polymerization of olefin by synthesizing titanium compounds chelated with various forms of diamide compounds. *J. Am. Chem. Soc.*, 120, p.8640 (1998), introduces polymerization reaction of propylene using titanium and zirconium compounds chelated by diamide. *Organometallics*, 17, p.4795 (1998), reports a catalyst for polymerization using titanium or zirconium chelated by $((Aryl-NCH_2CH_2)_2O)$ and $((Aryl-NCH_2CH_2)_2S)$. *Organometallics*, 17, p.4541 (1998), discusses a catalyst for polymerization of olefin by using titanium, vanadium, and chromium compounds, which are chelated by N,N-diphenyl-2,4-pentanediimine ligands. Moreover, *J. Am. Chem. Soc.*, 118, p.10008 (1996), describes a catalyst for polymerization of olefin, which is a titanium compound chelated by $(Aryl-NCH_2CH_2CH_2N-Aryl)$. U.S. Pat. No. 5,502,128 suggests a method of sPS polymerization of olefin using titanium zirconium compounds chelated by amidinate ligands. *Organmetallics*, 18, p.2046 (1999), introduces a non-metallocene catalyst of high activity by using a titanium or zirconium compound chelated by a phosphinimide-based amide compound. The aforementioned non-metallocene catalysts for polymerization of olefin using chelated titanium or zirconium compounds were developed as homogeneous catalyst systems using expensive MAO or boron compound as a co-catalyst. They were not intended as a heterogeneous catalyst system, which can be activated by a inorganic carrier. As such, it is difficult to directly apply such a system to the processes requiring catalysts having superior particle morphology, the processes which entail most of the conventional polymerization processes (e.g., gas phase polymerization process). thus there remain an unmet need for the development of a catalyst, which can be easily activated by an inorganic carrier (such as $MgCl_2$, which is utilized by most of the conventional processes) while having a non-metallocene compound or metallocene compound as a catalyst component.

SUMMARY OF INVENTION

The present invention provides solutions to the problems of prior art as above. As a catalyst component, the present invention uses a titanium compound chelated by an amide-base ligand and a cyclopentadiene-based ligand, which can be applied to the conventional process by the unique method of synthesis thereof. In this regard, one aspect of the present invention lies in providing a method of polymerization of olefin, which produces polymers of narrow distribution of molecular weights and even distribution of composition of co-polymers by using a catalyst for polymerization of olefin of a new concept, which can be activated by an inorganic carrier such as magnesium halide.

DETAILED DESCRIPTION OF INVENTION

Figure 1:
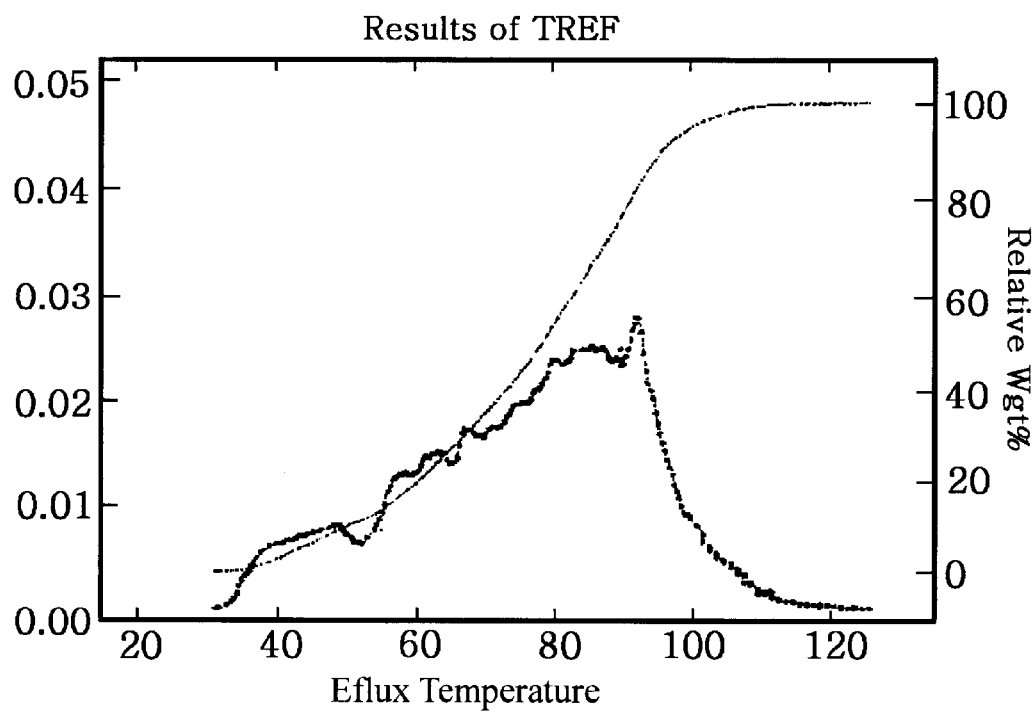
FIG. 1 is a graph, which shows the results of TREF of polymerization reactions according to Example 1 of the present invention.

In one embodiment of a catalyst for polymerization of olefin according to the present invention includes a titanium compound chelated by a cyclopentadiene-based ligand (hereinafter Cp-based ligand) and a ligand selected from the group consisting of carboiimide-based compound, diketiminato-based compound, and 2-phenylamino-4-phenylimino-2-pentene and its derivatives.

Such an illustrative catalyst system for polymerization of olefin according to the present invention includes making a magnesium-aluminum compound (A-1) having a Cp-based ligand and an amide-based chelated ligand, as shown in Reaction Formula 1, infra, and then reacting said compound (A-1) with a titanium halide compound:

Reaction Formula 1

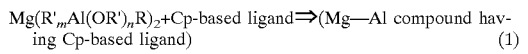
$Mg(R'_mAl(OR')_nR)_2$+Cp-based ligand$\Rightarrow$(Mg—Al compound having Cp-based ligand)   (1)

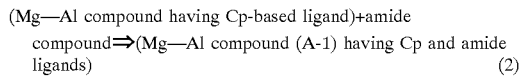
(Mg—Al compound having Cp-based ligand)+amide compound$\Rightarrow$(Mg—Al compound (A-1) having Cp and amide ligands)   (2)

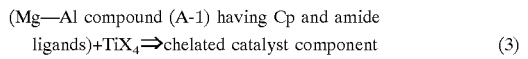
(Mg—Al compound (A-1) having Cp and amide ligands)+$TiX_4\Rightarrow$chelated catalyst component   (3)

In Reaction Formula 1, R and R' represent alkyl groups, with n=1, 2 or 3; m=3−n; and X is Cl, Br or OR.

The present invention also encompases a method of polymerization of olefin which is characterized by using a catalyst system which comprises a catalyst (A) having a titanium compound chelated by a Cp-based ligand and a ligand selected from the group consisting of carboiimide-based compound, diketiminato-based compound, and 2-phenylamino-4-phenylimino-2-pentene and its derivatives, as produced above; a magnesium halide compound (B); and a co-catalyst component (C).

In one illustrative embodiment of the method of polymerization of olefin according to the present invention, the magnesium halide compound (B) is produced by reacting a Grignard compound with an alkylhalide, or can be purchased from a manufacturer such as Grace Davison, Inc. for the use herein.

In the method of polymerization of olefin according to the present invention, an ordinary organometallic aluminum compound of $R''_nAlX_{3-n}$ is used for said co-catalyst component (C), instead of an expensive MAO or boron compound (wherein, R" is an alkyl group; and n is 1, 2 or 3).

In the present invention, polymerization refers not only to homo-polymerization of olefin but also to co-polymerization of olefin and other α-olefins.

Below, the present invention is described in detail. The chelated titanium compound catalyst (A) of the present invention is produced as a liquid compound, dissolvable in a non-polar solvent such as hexane or heptane, by means of reacting a $Mg(R'_mAl(OR')_nR)_2$ compound (wherein, R and R" are alkyl groups; n is 1, 2 or 3; and m=3−n) having magnesium and aluminum with a Cp-based ligand, as shown in Reaction Formula 1, the product of which is reacted with a ligand selected from the group consisting of carboiimide-based compound, diketiminato-based compound, and 2-phenylamino-4-phenylimino-2-pentene and its derivatives to produce a magnesium-aluminum compound (A-1) having a chelated ligand, and the product of which is reacted again with a titanium halide compound.

The catalyst (A) of the present invention produced as such can be easily activated as a catalyst for polymerization of olefin by means of a inorganic carrier such as magnesium halide. It also produces polymers having narrow distribution of molecular weights and even distribution of composition of co-polymers, in addition to showing a very stable polymerization reaction during gas phase polymerization.

The $Mg(R'_mAl(OR')_nR)_2$ compound used in the production of catalyst (A) according to the present invention, is produced in the case of "n=3" by means of preparing an aluminum alkoxy compound of $Al(OR)_3$ by reacting an ordinary organometallic aluminum compound of $AlR''_3$ with alcohol of ROH, as shown in Reaction Formula 2, infra, and then reacting a Grignard reagent of $R'_2Mg$ with said aluminum alkoxy compound to produce a compound of $Mg(Al(OR)_3R')_2$:

Reaction Formula 2

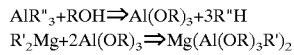
$AlR''_3+ROH\Rightarrow Al(OR)_3+3R''H$
$R'_2Mg+2Al(OR)_3\Rightarrow Mg(Al(OR)_3R')_2$ Here, R, R', and R" are alkyl groups, preferably $C_2$–$C_{10}$ alkyl groups and more preferably a combination of butyl and octyl groups.

The reaction of $AlR''_3$ with ROH, is an exothermic reaction, and it is carried out preferably by means of slow dripping of ROH into a diluted $AlR''_3$ at low temperature. As for the reaction time, it is preferable to maintain the reaction at a room temperature for one hour or more after the addition of the ROH is complete. Although the reaction of $R'_2Mg$ with $Al(OR)_3$ is a reaction which is slightly exothermic, it does not necessarily need a particular low temperature. As for the ordinary organometallic aluminum compound of $AlR''_3$, it preferably includes triethyl aluminum, trimethyl aluminum, triisobutylaluminum, trioctylaluminum, etc. As for alcohol of ROH, it is appropriate to use alcohol of an alkyl group, having six or more carbons, to control the reaction heat. For the Grignard compound in the form of R'$_2$Mg, it preferably includes dibutylmagnesium, buthylethylmagnesium, butyloctylmagnesium, etc. The reaction represented by Reaction Formula 2 is one that proceeds very easily, is preferably carried out at room temperature. As for reaction solvent, it is preferably a non-polar organic solvent, more preferably aliphatic hydrocarbons such as hexane or heptane.

As described in Reaction Formula 1, a magnesium compound having Cp and chelated ligands is produced by the reaction of Mg(Al(OR')$_3$R')$_2$, as produced above, with a Cp ligand and an amide-based chelated ligand. As for Cp-based ligands, the derivatives of Cp ligands, such as cyclopentadiene, indene, and fluorine, are appropriate. As for amide-based ligands, carbodiiamide-based compounds are appropriate, such as, dimethylcarbodiiamide, dicyclohexylcarbodiiamide, and 1,3-histrimethylsylylcarbodiiamide. Preferred examples include 2-phenylamino-4-phenyl-imino-2-pentene, phenylisocyanate, or the derivatives thereof. With regard to the amide-based ligands, diketiminato-based ligands are preferred, and more preferably include 2-phenylamino-4-phenyl-imino-2-pentene or the derivatives thereof, such as 2-(p-tolyamino)-4-(p-tolylimino)-2-pentene(2-(p-tolyamino)-4-(p-tolylimino)-2-petene), 2-((2,6-diisopropyl-phenyl)amino)-4-((2,6-diisopropylphenyl)imino)-2-pentene (2-((2,6-diisopropyl-phenyl)amino)-4-((2,6-diisopropyl-phenyl)imino)-2-pentene). A method of synthesizing the diketiminato is described in *Organometallics*, 17, p.$^3$070 (1998) or *Tetrahedron Letter*, 31, p.6005 (1990). Further, as for amide-based ligands, phenylisocyanate, or the derivatives thereof are also preferable.

The reaction of said Cp-based and amide-based ligands with Mg(Al(OR')$_3$R)$_2$ proceeds smoothly in a non-polar organic solvent, preferably an aliphatic hydrocarbon such as hexane or heptane. As for the reaction temperature, a mild reaction condition in the range of room temperature to less than 50° C. is preferable. A molar ratio of 1:1~1:1.5 is preferable, or more preferably 1:1.1. The reaction time of 1~3 hours is appropriate although as a practicle matter the reaction runs to completion after one or more hours.

By reacting a magnesium compound having a Cp-based ligand and an amide ligand group, as produced above, with a titanium compound, a chelated titanium compound in liquid is produced. In other words, the chelated titanium compound catalyst (A) is produced by dripping an aluminum-magnesium compound having Cp-based and amide ligands, as produced above, into a reaction mixture containing a titanium halide compound at room temperature, and then reacting the same at 65~70° for one hour or more. At that time, it is appropriate to have the molar ratio of 1:1 or 1.11 as between magnesium and titanium.

As for the titanium halide used herein, a titanium compound having at least two or more halide groups is preferable, such as TiCl$_4$, TiBr$_4$, TiCl$_2$(OR)$_2$, TiCl$_3$(OR), TiBr$_2$(OR)$_2$, and TiBr$_3$(OR), wherein R is an alkyl group. For smooth reaction, it is preferable to use a titanium halide compound in the form of an adduct (e.g., TiCl$_4$(THF)$_2$) which is produced by reacting the same with an ether-based solvent such as THF.

At the time of producing chelated titanium compound catalyst (A), magnesium halide compounds are produced as by-products of the reaction, which can be separated from the resulting reaction product mixture since they are not dissolved in a hydrocarbon solvent. The chelated titanium compound catalyst (A) dissolved in a non-polar solvent, such as heptane or hexane, is observed to be very stable and can be used directly as dissolved in a hydrocarbon solvent without an additional separation process. The chelated titanium compound catalyst in the state of liquid as dissolved in a non-polar solvent (e.g., hexane, heptane) has been used as a catalyst component for polymerization of olefin in conjunction with a magnesium halide compound (B).

The magnesium halide compound (B) used in the method of polymerization according to the present invention can be commercially purchased or produced in the following manner. The magnesium compound (B) is produced by reacting a Grignard reagent, which is produced from an arylhalide and a magnesium, metal with a specific alkylhalide (e.g., carbon tetrachloride). This method is preferably used because: First, it is easy to synthesize a pure magnesium halide compound through the reaction of a Grignard reagent with an alkylhalide compound; Second, it prevents admixing of other quadrivalent transition metals, which can act as an activation point in producing a carrier component (e.g., magnesium compound). For example, the magnesium halide compounds as produced by the following methods are generally large spheroidal particles with even distribution of particle size. The method of reacting carbon tetrachloride or butylchloride with a Grignard reagent produced by reacting chlorobenzene with metal magnesium; and the method of reacting butylchloride with a Grignard reagent produced by reacting chlorobutane with metal magnesium should be well known to one of ordinary skill in the art. As such, the magnesium halide compounds as produced above are appropriate for producing polymers of superior particle morphology by way of activating the chelated titanium compound catalyst (A) of the present invention.

In using a magnesium halide compound (B) having superior particle morphology, the magnesium halide itself can be contained in an inorganic carrier having superior particle morphology (e.g., silica), and the silica component containing magnesium halide can be prepared by a generally disclosed method. In other words, by making a solution by dissolving a magnesium halide compound in a hydrocarbon solvent in the presence of an electron donor (e.g., alcohol) and then reacting said solution with a compound which can react with an alkoxy group of alcohol on the surface of silica, the silica component containing magnesium halide can be produced by means of a method of removing alcohol to precipitate the solid component of magnesium halide on the surface of silica. For example, U.S. Pat. No. 5,155,078 discloses a method of producing silica containing magnesium halide, by means of including the solid component of a magnesium halide component onto the surface of silica by reacting an aluminum compound having reduction capability with alcohol, which is accomplished by reacting an alkylaluminum compound with silica (F952), which had been dried at 200° C. for more than 6 hours; coating the aluminum compound having reduction capability onto the surface of silica; and then reacting this with the solution having magnesium halide dissolved in the solution of alcohol and hydrocarbon solution. Moreover, the silica component containing magnesium halide can also be produced by a method of including a magnesium halide compound onto the surface of silica, wherein said magnesium halide compound is produced by reacting a Grignard compound with an alkyl halide or silicon halide compound on the surface of silica. In the present invention, the silica grade (Sylopol 5550 Grade) containing magnesium halide manufactured by Grace Davison, Inc. (USA) was used. The details of such an illustrative embodiment of the method of production are described through examples as below.

In one illustrative embodiment of the method of polymerization according to the present invention, an ordinary organic aluminum compound is used as a co-catalyst component (C). such a compound is expressed by a general formula of R"$_n$AlCl$_{3-n}$ (here, R" is an alkyl group, and n is 1, 2 or 3). Examples of such compounds include triethylaluminum (Et$_3$Al), triisopropylaluminum (iPr$_3$Al), triisobutylaluminum (i-Bu$_3$Al), tri-tertiary-butylaluminum (t-Bu$_3$Al), trioctylaluminum ((C$_8$H$_{17}$)$_3$Al), diethylaluminum chloride (EtAlCl), diethylaluminum sequis-chloride (Et$_3$Al$_2$Cl$_3$). The ratio of Al/Ti at 20~150 is appropriate, with the reaction temperature of polymerization of 40~100° C.

The catalyst for polymerization of olefin according to the present invention is also appropriate for homo-polymerization of ethylene and co-polymerization of α-olefin. Such α-olefins may have 3~10 carbon atoms, or preferably, α-olefins having at least 70% or more of ethylene wgt % in the case of co-polymerization. Illustratvie examples of such α-olefins which can co-polymerize ethylene include propylene, 1-butene, 1-pentene, 1-hexene, 4-methyl-1-pentene, or 1-octene or combinations of these.

The catalyst for polymerization of α-olefins according to the present invention is appropriate for slurry or gas phase polymerization, and in the case of slurry polymerization, an aliphatic or aromatic hydrocarbon as solvent is preferable. In the case of slurry polymerization, hydrocarbon such as hexane, heptane, pentane, cyclohexane, benzene or toluene can be used as solvent, with a preferable temperature of polymerization at 50~120° C. At the time of slurry polymerization, the amount of catalyst so added according to the present invention can vary, but it is preferable to use the catalyst in the amount of approximately 0.005~1 mmol to liter of hydrocarbon solvent, or more preferably 0.01~0.1 mmol to liter of hydrocarbon solvent. As for the pressure of ethylene during polymerization, it is preferable to maintain the pressure at 2~50 kg/cm$^2$.G. The adjustment of molecular weight can be achieved by means of controlling the temperature, α-olefin pressure, hydrogen pressure, etc.

The method of polymerization according to the present invention can be applied to slurry or gas phase polymerization. By means of polymerization of ethylene or co-polymerization of ethylene and α-olefin, the method can produce polymers of density of 0.900~0.960g/cm$^3$, with the MFR of molecular weight of 0.1~50 g/10 minutes. In particular, the ethylene/α-olefin co-polymers produced by the method of polymerization according to the present invention have narrow distribution of polymer composition and narrow distribution of molecular weights, which in turn leads to their high impact strength without containing sticky polymers of low molecular weights. As such, they are appropriate for LLDPE (linear low-density polyethylene) for high impact use (e.g., super hexane grade).

Below, the present invention is described in further detail by following examples. The examples as below are for illustrative purposes only and do not whatsoever limit the scope of protection accorded to the present invention.

Unless indicated otherwise, standard laboratory techniques suitable for the handling of the materials involved were followed. All chemicals used were of technical grade or higher and are generally commercially available. Water was removed from the hydrocarbon solvents, which were used in the production of catalysts, by distilling the same in the presence of sodium. Water was removed from the halogenated hydrocarbons by distilling the same in the presence of calcium hydride. All the reactions for production of catalysts were carried out in an atmosphere of nitrogen.

EXAMPLE 1

Production of Titanium Compound Chelated by Indene and Dicylcohexylcarbodiimide 800 mmol of Et$_3$Al was diluted to 800ml in hexane solution, after which was placed into an IL flask. It was maintained at room temperature by a coolant of room temperature. 2,400 mmol of 2-ethylhexanol was slowly dripped thereto to produce a colorless transparent solution. The dripping process took one hour. It was observed that gas was produced during the dripping process. After the dripping process, it was stirred for one hour at room temperature to complete the reaction. To this solution, 400 ml of a 1.0M of dibutylmagnesium in heptane solution was injected therein and stirred for one hour, which in turn lead to the production of Mg(Al(OC$_8$H$_{17}$)$_3$(butyl))$_2$ having magnesium and aluminum.

After placing 400 mmol of indene into a 3L flask and adding Mg(Al(OC$_8$H$_{17}$)$_3$(butyl))$_2$ solution as produced above, it was reacted for three hours at 40° C. To this, 82.4 g of dicyclohexyl-carbodiimide (400 mmol) was added again, after which was stirred for one hour at room temperature to produce the compound (A-1). With this compound (A-1) therein, 133.684 g of TiCl$_4$(THF)$_2$ (400 mmol) was reacted for six hours at room temperature. The solid matters of TiCl$_4$(THF)$_2$, which had initially been bright yellow, slowly turned into red, which in turn lead to the production of white-colored solid matters of magnesium halide. If stirring is stopped after six hours of stirring at room temperature, followed by a 20-minute wait, the white-colored solid matters settle on the bottom. The red supernatant solution was separated from the white-colored solid matters on the bottom and was transferred to another flask. The solution was then used as a chelated titanium compound catalyst component (A1) in liquid.

Spheroidal Magnesium Halide Component (B)

Silica Sylopol 5550 containing magnesium halide, which was purchased from Grace Davison, Inc., was used as a magnesium halide component (B).

Polymerization Reaction of Ethylene

At room temperature, 1,000 ml of hexane, which was used as a solvent for polymerization, was added to a 2L autoclave (inside volume), which had been sufficiently replaced with nitrogen. In this manner, nitrogen in the autoclave was replaced with ethylene. 3 mmol of (octyl)$_3$Al was added thereto at room temperature, and then 0.05 mmol of the chelated titanium compound (A1) as produced above and 0.2 g of the solid magnesium halide component (B) were added thereto. After adding hydrogen at 1.5 Kg/cm at 60° C. and then raising the temperature to 80° C., it was pressurized with ethylene to maintain the total pressure at 6 Kg/cm$^2$. The polymerization was carried out for one hour. The polymerized polymers were separated from hexane and then dried. As a result of polymerization, 250 g of polyethylene were recovered, and the M.I. (g/10 min) of the polymer was 0.7, and the MFRR was 25.1. As such, the polymer of narrow distribution of molecular weights could be obtained thereby (refer to Table 1).

Reaction of Ethylene/1-Hexene Co-Polymerization

Oxygen and water were removed from a 2L autoclave (inside volume) by connecting the same to a vacuum pump, which was then filled with ethylene gas. The process of connecting to the vacuum pump as such with an ethylene gas purge was repeated three times or more to purge the inside of the reactor with ethylene gas. 900 ml of hexane, which was used as a polymerization solvent, was added thereto, and then 90 ml of 1-hexene was injected, after which was stirred for 10 minutes. 3 mmol of (octyl)$_3$Al was added thereto at room temperature, and then 0.05 mmol of the chelated titanium compound (A1) as produced above and 0.1 g of the solid magnesium halide component (B) were injected thereto. After adding hydrogen at 1.5 kg/cm² at 60° C. and raising the temperature to 80° C., it was pressurized with ethylene to maintain the total pressure at 6 kg/cm². The polymerization was carried out for 20 minutes. After the polymerization, an ethanol solution was injected thereto to stop the reaction, and by adding an acidic alcohol solution, the polymer was separated therefrom. The M.I. of the separated polymer was 1.2, and the MFRR was 23.1. The characteristics of separated polymer are shown in Table 1, infra. As shown in Table 1, from the low MFRR values, the distribution of molecular weights was shown to be narrow. Moreover, it was confirmed that the distribution of composition of co-polymers was indeed even from the following results: the low Tm of the polymer containing a co-polymer of the equivalent amount; and the results of analysis of TREF (Temperature Rising Elution Fractionation) of FIG. 1.

EXAMPLE 2

Production of Titanium Compound (A1) Chelated by Indene and Dicyclohexylcarboiimide Ligand The chelated titanium compound was produced according to the same method of Example 1 and was used herein.
Spheroidal Magnesium Halide Component (B)

Figure 2:
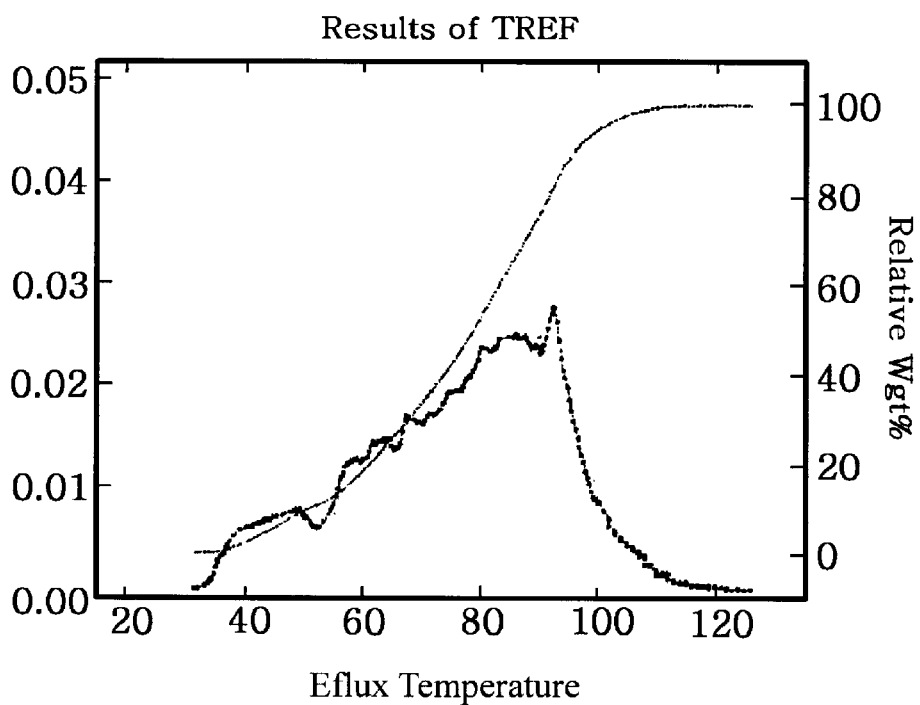
FIG. 2 is a graph, which shows the results of TREF of polymerization reactions according to Example 2 of the present invention.

19.2 g of magnesium metal was placed in an 1L flask, and then 20 ml of dibutylether was added thereto. After raising the temperature to 80° C., 5 ml of solution of a mixture of 2 g of iodine and 50 ml of chlorobutane was taken and injected thereto to activate the magnesium surface. Again, 20 ml of chlorobenzene was poured therein with 200 ml of dibutylether, and by dripping 240 ml of chlorobenzene therein at 90° C., the reaction as such was continued. The reaction was continued at 90° C. for five hours or more to complete the production of a Grignard reagent. Then, the Grignard reagent in liquid was separated from the solid component. Of the supernatant solution as separated, 120 ml (100 mml of Mg) was placed into an 1L flask. Then, 20 ml of carbon tetrachloride was slowly dripped thereto at 40° C. to produce spheroidal magnesium halide. After the dripping process, the magnesium halide component was produced to completion by raising the temperature to 80° C. for the reaction of one hour or more. Then, the solid magnesium halide carrier component was separated once again by pouring out the supernatant solution and washing it three times with hexane.
Reactions of Ethylene Homo-Polymerization and Co-Polymerization The polymerization and co-polymerization reactions were carried out according to the same method of Example 1. The results of polymerization are described in Table 1, infra, and the results of TREF analysis are shown in FIG. 2.

EXAMPLE 3

Synthesis of 2-phenylamino-4-phenyl-imino-2-pentene 500 g of 2,4-pentanedione (5.0 mol) and 600 g of aniline (6.4 mol) together were stirred with 1,000 g of MgSO₄ (8.3 mol) for 12 hours at 100° C. 605 g of the solid product (2-phenylamino-4-phenyl-imino-2-pentene) of pale yellowish color was obtained as below at a yield of 70% by filtering the solid matters therefrom and recrystalizing the filtered solution with n-pentane: ¹H-NMR(CDCl₃) δ 1.98(s, CH₃), 2.10 (s, CH₃), 5.18 (s, =CH), 7.2 (m.Ph), 12.6 (brs, NH).

605 g of the 2-phenylimino-4-pentanone obtained as above, and 449 g of aniline hydrochloride (3.4mol) were dissolved in abs. EtOH₂ and refluxed for two hours. By cooling it to room temperature, the yellowish green solid products were produced. After filtering the solid matters and drying, they were suspended in 1L of ether. Then, 1.2L of 150 g of NaOH (3.76 mol) in H₂O was poured therein and stirred for one hour at room temperature. The organic layer was separated and washed, followed by drying with MgSO₄. The solid matters were filtered, and the solvent was evaporated under pressure to produce greenish yellow solid matters. By recrystallizing with n-pentane, 650 g of the product as below was obtained at a yield of 75%: ¹H-NMR(CDCl₃) δ 1.95 (s, 2CH₃), 4.93 (s, =CH), 7.02 (m.Ph), 7.31 (m.Ph), 13.2 (brs, NH)
Production of Titanium Compound (A2) Chelated by Indene and 2-phenylamino-4-phenyl-imino-2-pentene 100 mmol of Et₃Al was diluted to 100 ml in hexane solution, after which was placed into an 1L flask. It was maintained at room temperature by a coolant of room temperature. 300 mmol of 2-ethylhexanol (47 ml) was slowly dripped thereto to produce a colorless transparent solution. The dripping process took one hour. It was observed that gas was produced during the dripping process. After the dripping process, it was stirred for one hour at room temperature to complete the reaction. To this solution, 50 ml of 1.0M of butyloctylmagnesium in heptane solution was injected therein and stirred for one hour, which in turn lead to the production of Mg(Al(OC₈H₁₇)₃(butyl))₂ having magnesium and aluminum.

After placing 50 mmol of indene into an 1L flask and adding 50 mmol of Mg(Al(OC₈H₁₇)₃(butyl))₂ solution as produced above, it was reacted for three hours at 40° C. To this, 12.50 g of 2-phenylamino-4-phenyl-imino-2-pentene (50mmol) was added again, after which was stirred for one hour at room temperature to produce the compound (A-2). With this compound (A-2) therein, 16.7 g of TiCl₄(THF)₂ (50 mmol) was reacted for six hours at room temperature. The solid matters of TiCl₄(THF)₂, which had initially been bright yellow, slowly turned into red, which in turn lead to the production of white-colored solid matters of magnesium halide. If stirring is stopped after six hours of stirring at room temperature, followed by a 20-minute wait, the white-colored solid matters settle on the bottom. The red supernatant solution was separated from the white-colored solid matters on the bottom and was transferred to another flask. The solution then was used as a chelated titanium compound catalyst component (A2) in liquid.
Granular Magnesium Halide Component (B)

The Silica Sylopol 5550 containing magnesium halide, which was purchased from Grace Davison, Inc. was used as a magnesium halide (B) component.
Reactions of Ethylene Polymerization and Co-Polymerization The polymerization and co-polymerization reactions were carried out according to the same method of Example 1. The results of polymerization are shown in Table 1, infra.

EXAMPLE 4

Production of Titanium Compound (A3) Chelated by Indene and Phenylisocyanate 100 mmol of Et₃Al was diluted to 100 ml in hexane solution, after which was placed into an 1L flask. It was maintained at room temperature by a coolant of room temperature. 300 mmol of 2-ethylhexanol (47 ml) was slowly dripped thereto to produce a colorless transparent solution. The dripping process took one hour. It was observed that gas was produced during the dripping process. After the dripping process, it was stirred for one hour at room temperature to complete the reaction. To this solution, 50 ml of 1.0M of butyloctylmagnesium in heptane solution was injected therein and stirred for one hour, which in turn lead to the production of Mg(Al(OC₈H₁₇)₃(butyl))₂ having magnesium and aluminum.

After placing 400 mmol of indene into a 3L flask and adding Mg(Al(OC₈H₁₇)₃(butyl))₂ solution as produced above, it was reacted for three hours at 40° C. To this, 6.0 g of phenylisocyanate (50 mmol) was added again, after which was stirred for one hour at room temperature to produce the compound (A-3). With this compound (A-3) therein, 16.7 g of $TiCl_4(THF)_2$ (50 mmol) was reacted for six hours at room temperature. The solid matters of $TiCl_4(THF)_2$, which had initially been bright yellow, slowly turned into red, which in turn lead to the production of white-colored solid matters of magnesium halide. If stirring is stopped after six hours of stirring at room temperature, followed by a 20-minute wait, the white-colored solid matters settle on the bottom. The red supernatant solution was separated from the white-colored solid matters on the bottom and was transferred to another flask. The solution was then used as a chelated titanium compound catalyst component (A3) in liquid.

Spheroidal Magnesium Halide Carrier Component (B)

The Silica Sylopol 5550 containing magnesium halide, which was purchased from Grace Davison, Inc. was used as a magnesium halide (B) component.

Reactions of Ethylene Polymerization and Co-Polymerization

The polymerization and co-polymerization reactions were carried out according to the same method of Example 1. The results of polymerization are shown in Table 1, infra.

EXAMPLE 5

Production of Titanium Compound (A5) Chelated by Cyclopentadiene and Dicyclohexylcarbodiimide Ligands 800 mmol of $Et_3Al$ was diluted to 800 ml in hexane solution, after which was placed into a 1L flask. It was maintained at room temperature by a coolant of room temperature. 2,400 mmol of 2-ethylhexanol (375 ml) was slowly dripped thereto to produce a colorless transparent solution. The dripping process took one hour. It was observed that gas was produced during the dripping process. After the dripping process, it was stirred for one hour at room temperature to complete the reaction. To this solution, 1.0M of butyloctylmagnesium in 400 ml of heptane solution was injected therein and stirred for one hour, which in turn lead to the production of $Mg(Al(OC_8H_{17})_3(butyl))_2$ having magnesium and aluminum.

After placing 400 mmol of cyclopentadienyltitanium trichloride into a 3L flask and adding $Mg(Al(OC_8H_{17})_3(butyl))_2$ solution as produced above, it was reacted for three hours at 40° C. To this, 82.4 g of dicyclohexylcarbodiimide (400 mmol) was added again, after which was stirred for six hour at room temperature to produce white-colored solid matters of magnesium halide. If stirring is stopped after six hours of stirring at room temperature, followed by a 20-minute wait, the white-colored solid matters settle on the bottom. The red supernatant solution was separated from the white-colored solid matters on the bottom and was transferred to another flask. The solution then was used as a chelated titanium compound catalyst component (A5) in liquid.

Spheroidal Magnesium Halide Component (B)

The Silica Sylopol 5550 containing magnesium halide, which was purchased from Grace Davison, Inc. was used as a magnesium halide (B) component.

Reactions of Ethylene Polymerization and Co-Polymerization

The polymerization and co-polymerization reactions were carried out according to the same method of Example 1. The results of polymerization are shown in Table 1, infra.

COMPARATIVE EXAMPLE

Production of Catalyst 19.2 g of magnesium metal were poured into an 1L flask, and 20 ml of dibutylether was added thereto. After raising the temperature to 80° C., 5 ml of solution of a mixture of 2 g of iodine and 50 ml of chlorobutane was taken and injected thereto to active the surface of magnesium. Again, 20 ml of chlorobenzene was injected therein with 200 ml of dibutylether, and by dripping 400 ml of chlorobenzene thereto at 90° C., the reaction here was continued. At 90° C., the reaction was continued for five hours or more to complete the production of a Grignard reagent. Then, the Grignard reagent in liquid was separated from the solid component. Of the supernatant solution as separated, 120 ml thereof (100 mmol of Mg) was placed into an 1L flask. Then, 20 ml of carbon tetrachloride was slowly dripped thereto at 40° C. to produce spheroidal magnesium halide. After the dripping process, the magnesium halide component was produced to completion by raising the temperature to 80° C. for the reaction of one hour or more. Then, the solid magnesium halide carrier component was separated once again by pouring out the supernatant solution and washing it three times with hexane. To the carrier as produced above, 300 ml of hexane was injected, followed by 30 ml of $TiCl_4$, and then heated at 60° C. for one hour. After the completion of reaction, the supernatant was poured out at 60° C., and washed three times with hexane to complete the production of catalysts. The ratio of titanium carrier was 3.5%.

Reactions of Ethylene Homo-Polymerization and Co-Polymerization

Figure 3:
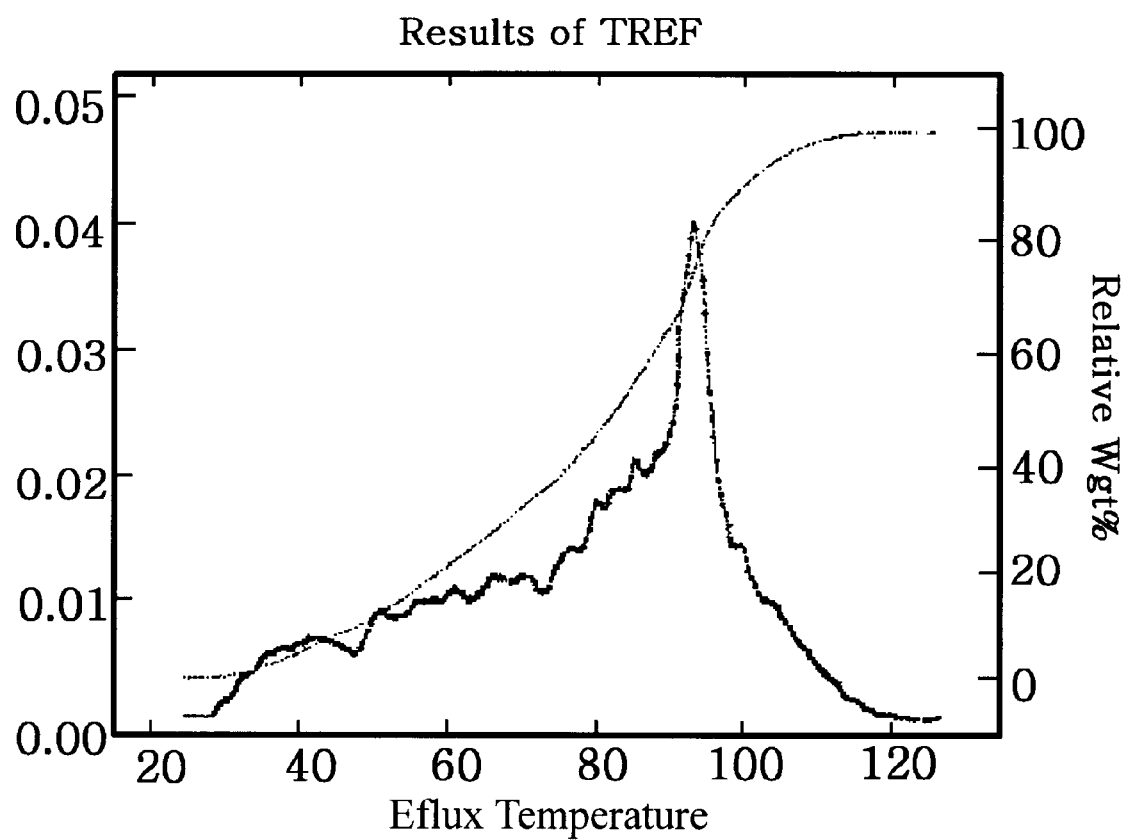
FIG. 3 is a graph, which shows the results of TREF of polymerization reactions according to Comparative Example of the present invention.

By using the catalyst as produced above, the polymerization and co-polymerization reactions were carried out according to the same method of Example 1. The results of polymerization are described in Table 1, infra, and the results of TREF analysis are shown in FIG. 3.

TABLE 1

| | Ethylene Polymerization Reaction | | | | Ethylene/1-hexene Co-polymerization Reaction | | | |
|---|---|---|---|---|---|---|---|---|
| Type | Activity (a) | M.I. (b) | MFRR (c) | B/D (d) | M.I. (b) | MFRR (c) | ΔHm (J/g) (e) | Tm (° C.) |
| Example 1 | 5,000 | 0.7 | 25.1 | 0.42 | 1.2 | 23.1 | 107 | 123.3 |
| Example 2 | 4,500 | 0.5 | 26.2 | 0.42 | 1.5 | 24.2 | 105 | 122.1 |
| Example 3 | 4,000 | 0.6 | 26.3 | 0.41 | 1.6 | 25.3 | 104 | 122.3 |
| Example 4 | 3,800 | 1.3 | 24.2 | 0.41 | 0.9 | 25.4 | 110 | 123.8 |
| Example 5 | 4,800 | 1.5 | 23.6 | 0.40 | 1.8 | 22.3 | 110 | 122.3 |
| CE* | 2,500 | 0.6 | 29.3 | 0.37 | 1.2 | 30.3 | 105 | 125 |

*CE: Comparative Example
(a) Unit of Activity = g-PE/mmol-Ti.hr
(b) 2.16 Kg/10 minutes
(c) Ratio of Melt Index (2.16 kg/2.16 kg, 10 minutes)
(d) Unit = g/cm$^3$
(e) $C_6$ Content = 7.0 ~ 7.1%

As shown in Table 1, the polymers polymerized according to the present invention had MFRR's of 23~25, which were lesser than 29 of Comparative Example, and therefore had narrow distributions of molecular weights. Moreover, the Tm's of the polymers having the same amounts of $C_6$ branch were 122~123° C., which were lesser than 125° C. of that of Comparative Example. As shown in Table 1 and the TREF data of FIG. 2, the present invention produces co-polymers of even distribution of branches within polymer chains. Further, the present invention allows production of catalysts of high activity by means of using a titanium compound as a catalyst component chelated by a cyclopentadiene-based ligand and a ligand selected from the group consisting of carboiimide-based compound, diketiminato-based compound, and 2-phenylamino-4-phenylimino-2-pentene and its derivatives.

As described above, one of ordinary skill in the art should appreciate that the catalysts of the present invention allow production of polymers of narrow distribution of molecular weights and even distribution of composition of co-polymers.

In view of the above disclosure, one of ordinary skill in the art should understand and appreciate that one illustrative embodiment of the present invention includes a catalyst for polymerization of olefin or the copolymerization of olefins that is a chelated titanium compound made in a manner as substantially described above. Such a chelated titanium compound may be produced by reacting a $Mg(R'_mAl(OR')_nR)_2$ compound wherein R and R' are alkyl groups, with n=1, 2 or 3, and m=3−n, with a cyclopentadiene-based ligand to give a first intermediate. It is preferred that the cyclopentadiene ligand be selected from cyclopentadiene, indene, and fluorene. The first intermediate is reacted with a ligand selected from the group consisting of carboiimide-based compound, diketiminato-based compound, and 2-phenylamino-4-phenylimino-2-pentene and its derivatives to produce a magnesium-aluminum compound having chelated ligands. Preferably the amide based ligand is either a carbodiimide-based or diketiminato-based compound and more preferably the amide-based ligand is 2-phenylamino-4-phenyl-imino-2-pentene or its derivate. The magnesium-aluminum compound having chelated ligands is reacted with a titanium compound having a general formula of $TiX_4$ wherein X is Cl, Br, or OR, and R is an alkyl group to give said chelated titanium compound.

Another illustrative embodiment of the present invention includes a chelated titanium compound catalyst for the polymerization of olefin, in which the chelated titanium compound is produced by reacting a $Mg(R'_mAl(OR')_nR)_2$ compound wherein R and R' are alkyl groups, with n=1, 2 or 3, and m=3−n, with a cyclopentadiene-based ligand, to give a first intermediate. Preferably the cyclopentadiene-based ligand is selected from cyclopentadiene, indene, and fluorene. The first intermediate is reacted with a ligand selected from the group consisting of carboiimide-based compound, diketiminato-based compound, and 2-phenylamino-4-phenylimino-2-pentene and its derivatives preferably selected from carbodiimide-based or diketiminato-based compounds, to produce a magnesium-aluminum compound having chelated ligands. In a preferred embodiment the amide-based ligand is 2-phenylamino-4-phenyl-imino-2-pentene or its derivate. The magnesium-aluminum compound having chelated ligands is then reacted with a titanium compound of $TiX_4$, wherein X is Cl, Br, or OR, and R is an alkyl group to give the desired chelated titanium compound. Preferably the titanium compound is in the form of a solvated adduct having the formula $TiX_4(Sol)_2$ in which Sol is an ether solvent preferably tetrahydrofuran.

It will also be appreciated by one or ordinary skill in the art that a present illustrative embodiment of the present invention includes a method of forming a chelated titanium compound catalyst for the polymerization of olefin. One such illustrative embodiment of the inventive method includes: reacting a $Mg(R'_mAl(OR')_nR)_2$ compound, in which R and R' are alkyl groups, with n=1, 2 or 3, and m=3−n, with a cyclopentadiene-based ligand selected from cyclopentadiene, indene, and fluorene, to give a first intermediate. Then reacting the first intermediate with a ligand selected from the group consisting of carboiimide-based compound, diketiminato-based compound, and 2-phenylamino-4-phenylimino-2-pentene and its derivatives selected from carbodiimide-based or diketiminato-based compounds, to produce a magnesium-aluminum compound having chelated ligands. And then reacting the magnesium-aluminum compound having chelated ligands with a titanium compound of $TiX_4$, wherein X is Cl, Br, or OR, and R is an alkyl group to give the desired chelated titanium compound catalyst. In one preferred embodiment of the amide-based ligand is 2-phenylamino-4-phenyl-imino-2-pentene or its derivate.

It should also be appreciated that the present invention also encompasses methods of polymerization or co-polymerization of olefins. In one such illustrative method, the polymerization is carried out by using a catalyst system comprising a catalyst of a chelated titanium compound of the type described above in the preceeding illustrative embodiments; a magnesium halide compound; and a co-catalyst component. In one preferred embodiment, the magnesium halide compound is produced by reacting a Grignard reagent with carbon tetrachloride. In another preferred embodiment, the co-catalyst component is an organometallic aluminum compound of $R''_nAlCl_{3-n}$, wherein R" is an alkyl group, with n=1, 2, or 3. The method of polymerization may be carried out as a slurry phase reaction to more preferably the polymerization is carried out by gas phase polymerization.

It should be appreciated that the illustrative embodiment of polymerizing or copolymerizing an olefin, should be carried out under conditions suitable for polymerization of said olefin to give a polymerized olefin. Such conditions should be well known to one of skill in the art and include the presence of hydrogen and olefin under pressure and elevated temperatures.

Thus one of ordinary skill in the art should appreciate that the present invention includes a method of forming a polymerized olefin including: combining an olefin, hydrogen and a catalyst system, reacting said reaction mixture under conditions suitable for polymerization of said olefin to give a reaction mixture containing a polymerized olefin, and recovering said polymerized olefin from said reaction mixture. The catalyst system utilized to carry out said method includes a chelated titanium compound of the type described in the current disclosure, a magnesium halide compound; and a co-catalyst component. Preferably the magnesium halide compound is produced by reacting a Grignard reagent with carbon tetrachloride and the co-catalyst component is an organometallic aluminum compound of $R''_nAlCl_{3-n}$, wherein R" is an alkyl group, with n=1, 2, or 3. It is also preferred that the method of polymerization or co-polymerization of olefin according to the present illustrative embodiment be carried out by gas phase polymerization.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A catalyst for polymerization of olefin, comprising
    a chelated titanium compound, wherein said chelated titanium compound is produced by reacting a Mg(R'$_m$Al(OR')$_n$R)$_2$ compound wherein R and R' are alkyl groups, with n=1, 2 or 3, and m=3−n, with a cyclopentadiene-based ligand to give a first intermediate;
    reacting the first intermediate with a ligand selected from the group consisting of carbodiimide-based compounds, diketiminato-based compounds, and 2-phenylamino-4-phenylimino-2-pentene and its derivatives to produce a magnesium-aluminum compound having chelated ligands; and
    reacting the magnesium-aluminum compound having chelated ligands with a titanium compound of TiX$_4$, wherein X is Cl, Br, or OR, and R is an alkyl group to give said chelated titanium compound.

2. The catalyst for polymerization of olefin according to claim 1, wherein said cyclopentadiene-based ligand is selected from the group consisting of cyclopentadiene, indene, and fluorene.

3. A method of polymerization or co-polymerization of olefin, wherein the method is carried out by using a catalyst system comprising a catalyst of a chelated titanium compound of claim 1; a magnesium halide compound; and a co-catalyst component.

4. The method of polymerization or co-polymerization of olefin according to claim 3, wherein a magnesium halide compound is produced by reacting a Grignard reagent with carbon tetrachloride.

5. The method of polymerization or co-polymerization of olefin according to claim 4, wherein a co-catalyst component is an organometallic aluminum compound of R"$_n$AlCl$_{3-n}$, wherein R" is an alkyl group, with n=1, 2, or 3.

6. The method of polymerization or co-polymerization of olefin according to claim 5, wherein the method is carried out by gas phase polymerization.

7. A chelated titanium compound catalyst for the polymerization of olefin, wherein said chelated titanium compound is produced by reacting a Mg(R'$_m$Al(OR')$_n$R)$_2$ compound wherein R and R' are alkyl groups, with n=1, 2 or 3, and m=3−n, with a cyclopentadiene-based ligand selected from the group consisting of cyclopentadiene, indene, and fluorene, to give a first intermediate;
    reacting the first intermediate with a ligand selected from the group consisting of carbodiimide-based or diketiminato-based compounds, to produce a magnesium-aluminum compound having chelated ligands; and
    reacting the magnesium-aluminum compound having chelated ligands with a titanium compound solvent adduct of TiX$_4$(Sol)$_2$, wherein X is Cl, Br, or OR, and R is an alkyl group and Sol is an ether based solvent, to give said chelated titanium compound.

8. The compound of claim 7, wherein the titanium compound solvent adduct is an adduct of tetrahydrofuran.

9. A method comprising polymerizing an olefin, wherein said polymerization is carried out in the presence of a catalyst system, wherein said catalyst system includes a chelated titanium compound of claim 7, a magnesium halide compound; and a co-catalyst component.

10. A method of polymerization or co-polymerization of olefin according to claim 9, wherein said magnesium halide compound is produced by reacting a Grignard reagent with carbon tetrachloride.

11. A method of polymerization or co-polymerization of olefin according to claim 10, wherein said co-catalyst component is an organometallic aluminum compound of R"$_n$AlCl$_{3-n}$, wherein R" is an alkyl group, with n=1, 2, or 3.

12. A method of polymerization or co-polymerization of olefin according to claim 11, wherein the method is carried out by gas phase polymerization.

13. A method of polymerizing or copolymerizing an olefin, said method comprising reacting said olefin under conditions suitable for polymerization of said olefin to give a polymerized olefin, wherein said reaction is carried out in the presence of a catalyst system, wherein said catalyst system includes a chelated titanium compound of claim 7, a magnesium halide compound; and a co-catalyst component.

14. The method of polymerization or co-polymerization of olefin according to claim 13, wherein said magnesium halide compound is produced by reacting a Grignard reagent with carbon tetrachloride.

15. The method of polymerization or co-polymerization of olefin according to claim 14, wherein said co-catalyst component is an organometallic aluminum compound of R"$_n$AlCl$_{3-n}$, wherein R" is an alkyl group, with n=1, 2, or 3.

16. The method of polymerization or co-polymerization of olefin according to claim 15, wherein the method is carried out by gas phase polymerization.

17. A method of forming a polymerized olefin or a copolymerized olefin, said method comprising
    combining an olefin, hydrogen and a catalyst system, wherein said catalyst system includes a chelated titanium compound of claim 7, a magnesium halide compound; and a co-catalyst component to give a reaction mixture;
    reacting said reaction mixture under conditions suitable for polymerization of said olefin to give a reaction mixture containing a polymerized olefin, and
    recovering said polymerized olefin from said reaction mixture.

18. The method of polymerization or co-polymerization of olefin according to claim 17, wherein said magnesium halide compound is produced by reacting a Grignard reagent with carbon tetrachloride.

19. The method of polymerization or co-polymerization of olefin according to claim 17, wherein said co-catalyst component is an organometallic aluminum compound of R"$_n$AlCl$_{3-n}$, wherein R" is an alkyl group, with n=1, 2, or 3.

20. The method of polymerization or co-polymerization of olefin according to claim 19, wherein the method is carried out by gas phase polymerization.

21. A method of forming a chelated titanium compound catalyst for the polymerization of olefin, said method comprising:
    reacting a Mg(R'$_m$Al(OR')$_n$R)$_2$ compound wherein R and R' are alkyl groups, with n=1, 2 or 3, and m=3−n, with a cyclopentadiene-based ligand selected from the group consisting of cyclopentadiene, indene, and fluorene, to give a first intermediate;
    reacting the first intermediate with a ligand selected from the group consisting of carbodiimide-based or diketiminato-based compounds, to produce a magnesium-aluminum compound having chelated ligands; and
    reacting the magnesium-aluminum compound having chelated ligands with a titanium compound of TiX$_4$, wherein X is Cl, Br, or OR, and R is an alkyl group to give said chelated titanium compound catalyst.

* * * * *